United States Patent
Porat-Stoler et al.

(10) Patent No.: US 10,339,066 B2
(45) Date of Patent: Jul. 2, 2019

(54) OPEN-ADDRESSING PROBING BARRIER

(71) Applicant: International Business Machines Corporation, Armonk, NY (US)

(72) Inventors: Asaf Porat-Stoler, Ramat Gan (IL); Yosef Shatsky, Karnei Shomron (IL); Tom Sivan, Kiryat Ono (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/715,459

(22) Filed: Sep. 26, 2017

(65) Prior Publication Data

US 2019/0095342 A1    Mar. 28, 2019

(51) Int. Cl.
| | | |
|---|---|---|
| *G06F 12/121* | (2016.01) | |
| *G06F 12/1018* | (2016.01) | |
| *G06F 12/1027* | (2016.01) | |
| *G06F 16/28* | (2019.01) | |
| *G06F 12/1009* | (2016.01) | |

(52) U.S. Cl.
CPC ...... *G06F 12/1018* (2013.01); *G06F 12/1027* (2013.01); *G06F 12/121* (2013.01); *G06F 16/284* (2019.01); *G06F 12/1009* (2013.01); *G06F 2212/621* (2013.01); *G06F 2212/65* (2013.01)

(58) Field of Classification Search
CPC .......... G06F 17/3033; G06F 17/30949; G06F 17/30629; G06F 12/1018
See application file for complete search history.

(56) References Cited

U.S. PATENT DOCUMENTS

| | | | | |
|---|---|---|---|---|
| 5,287,499 A | * | 2/1994 | Nemes | ................ G06F 12/0292 |
| 7,031,985 B1 | * | 4/2006 | Pecheny | ........... G06F 17/30985 |

(Continued)

FOREIGN PATENT DOCUMENTS

| | | | | |
|---|---|---|---|---|
| CN | 106055646 A | | 10/2016 | |
| CN | 106202548 A | | 12/2016 | |
| WO | WO 2011/073680 | * | 6/2011 | ....... G06F 17/30949 |

OTHER PUBLICATIONS

Brent, Richard P., "Reducing the Retrieval Time of Scatter Storage Techniques", Communications of the ACM, vol. 16, No. 2, Feb. 1973, 1 page.

(Continued)

*Primary Examiner* — Edward J Dudek, Jr.
(74) *Attorney, Agent, or Firm* — Francis Lammes; Stephen J. Walder, Jr.; Jason H. Sosa

(57) ABSTRACT

An open address probing barrier is utilized in association with a memory container. A starting memory slot is calculated for an item to be found in the memory container. Responsive to the item failing to occupy the starting memory slot, a first predetermined number of memory slots immediately following the starting memory slot are probed. Responsive to the item occupying one of those memory slots, the item is returned to the application. Responsive to the item failing to occupy one of those memory slots, a determination is made as to whether a barrier bit has been set in association with the last of the first predetermined number of memory slots. If so, at least a portion of the memory container is probed for the item and, if found, the item is returned to the application. If the barrier bit is not set, a notification is returned to the application.

18 Claims, 6 Drawing Sheets

(56) References Cited

U.S. PATENT DOCUMENTS

| | | | |
|---|---|---|---|
| 9,104,678 B1* | 8/2015 | Nemes | G06F 17/30132 |
| 9,141,667 B2 | 9/2015 | Barber et al. | |
| 9,292,560 B2 | 3/2016 | Attaluri et al. | |
| 2015/0261751 A1 | 9/2015 | Kim et al. | |
| 2015/0286639 A1* | 10/2015 | Bordawekar | G06F 17/30949 |
| | | | 707/747 |
| 2017/0242880 A1 | 8/2017 | Barzilli | |
| 2017/0344545 A1* | 11/2017 | Roustant | G06F 17/303 |

OTHER PUBLICATIONS

Celts, Pedro et al, "Robin Hood Hashing", IEEE, 26th Annual Symposium on Foundations of Computer Science, Oct. 1985, IEEE Xplore, Jul. 18, 2008, pp. 281-288.

Gunji, Takao et al., "Studies on Hashing Part-1: A Comparison of Hashing Algorithms with Key Deletion", Journal of Information Processing, vol. 3, No. 1, 1980, 12 pages.

Pagh, Rasmus et al., "Cuckoo Hashing", Journal of Algorithms, vol. 51, Issue 2, 2004, 24 pages.

Peterson, W.W., "Addressing for Random-Access Storage", IBM Journal of Research and Development vol. 1, No. 2, pp. 130-146, Apr. 1957.

Ross, Kenneth A., "Efficient Hash Probes on Modern Processors", IEEE, IEEE 23rd International Conference on Data Engineering, Apr. 15, 2007, pp. 1297-1301.

International Search Report and Written Opinion dated Jan. 4, 2019 for International Application No. PCT/IB2018/057276, 9 pages.

* cited by examiner

US 10,339,066 B2

OPEN-ADDRESSING PROBING BARRIER

BACKGROUND

The present application relates generally to an improved data processing apparatus and method and more specifically to mechanisms for open-addressing probing barrier.

A key-value store, or key-value database, is a data storage paradigm designed for storing, retrieving, and managing associative arrays, which a data structure is more commonly known as a dictionary or hash table. Dictionaries, hash tables, or the like, comprise a collection of objects, records, or the like, Which in turn have many different fields within them, each containing data. These records are stored and retrieved using a hash-based key that uniquely identifies the record and is used to quickly find the data within the data structure.

Key-value stores work in a very different fashion from the better known relational databases (RDB). RDBs pre-define the data structure in the database as a series of tables containing fields with well-defined data types. Exposing the data types to the database program allows it to apply a number of optimizations. In contrast, key-value stores treat the data as a single opaque collection which may have different fields for every record. This offers considerable flexibility and more closely follows modern concepts like object-oriented programming Because optional values are not represented by placeholders as in most RDBs, key-value stores often use far less memory to store the same database, which can lead to large performance gains in certain workloads.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for utilizing an open address probing barrier in association with a memory container. The illustrative embodiment calculates a starting memory slot for the item in response to receiving a request from an application to find an item in the memory container. The illustrative embodiment probes a first predetermined number of memory slots immediately following the starting memory slot for the item in response to the item failing to occupy the starting memory slot. The illustrative embodiment returns the item to the application in response to the item occupying one of the first predetermined numbers of memory slots immediately following the starting memory slot. The illustrative embodiment determines whether a barrier bit has been set in association with the last of the first predetermined number of memory slots in response to the item failing to occupy one of the first predetermined numbers of memory slots immediately following the starting memory slot. The illustrative embodiment probing at least a portion of the memory container for the item in response to the harrier bit being set and returns the item to the application in response to the item being found in the portion of the memory container. The illustrative embodiment returns a notification that the item does not exist in the memory container to the application in response to the barrier bit failing to be set.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
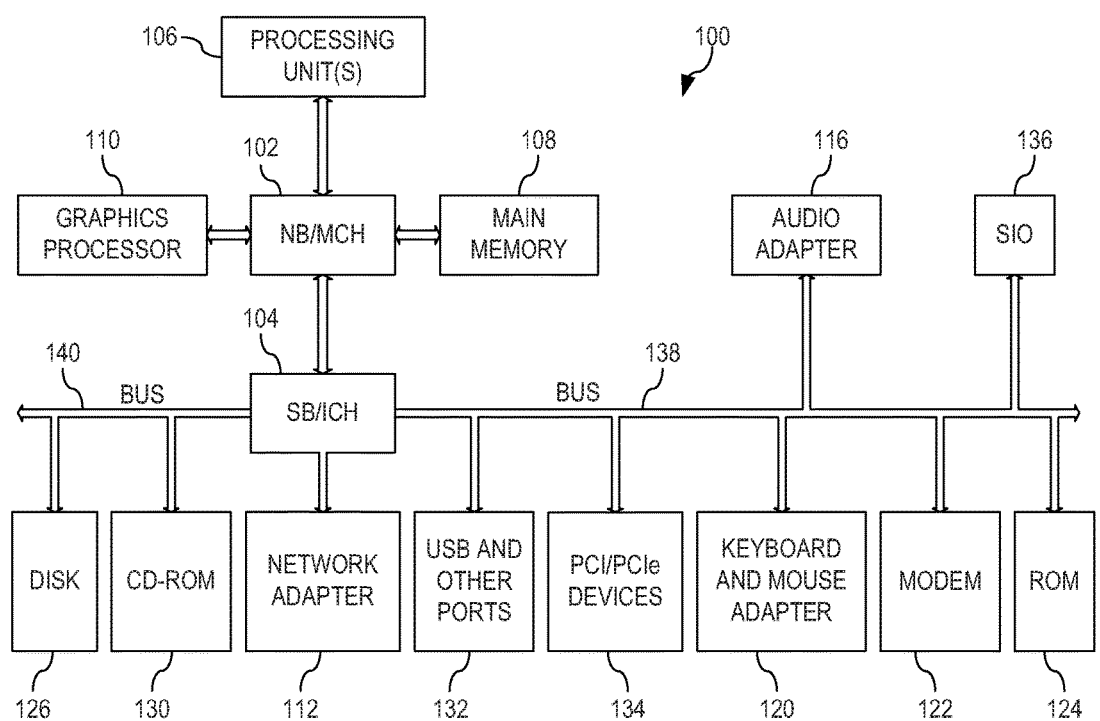
FIG. 1 is an example block diagram of a computing device in which aspects of the illustrative embodiments may be implemented.

The illustrative embodiments provide mechanisms for an open-addressing probing barrier. As noted above, a key-value store, or key-value database, is a data storage paradigm designed for storing, retrieving, and managing associative arrays, which a data structure is more commonly known as a dictionary or hash table. Dictionaries, hash tables, or the like, comprise a collection of items, objects, records, or the like, which in turn have many different fields within them, each containing data. The item is are stored and retrieved using a hash-based key that uniquely identifies the record and is used to quickly find the item within the data structure.

However, in a hash-based key-value store, a mechanism is required to resolve conflicts. A conflict occurs when the hashing algorithm maps multiple items to the same location in the key-value store. One current type of conflict resolution is chaining. Chaining allows a specific location, bucket, slot, or the like, in the data structure to contain multiple items. While chaining is a very common solution, chaining has disadvantages, particularly for the case of small items. Since the depth of the slot in the data structure may vary, dynamic memory allocation is typically used. However, memory allocation comes with a performance penalty and is not always possible such as in real-time systems. Additionally, chaining comes with a memory overhead. For example, a single pointer to the next item is an 8 byte overhead which may be substantial if the item size is small.

Another current type of conflict resolution is open addressing. If upon insertion the slot is already taken, a new or existing item will be place in an alternative slot. A set of rules is required to define which alternative slot to use and how the search for items takes place. Open addressing does not have the same disadvantages of chaining and also has good cache lining. However, there are drawbacks to open addressing, such as:

Not all slots may be utilized. That is, to run efficiently, a resize is required when the data structure reaches 70%-80% utilization; and Depending of the implementation, either inserts or searches may require many steps.

The use of hash tables with open address is a mature field with lots of existing work. Listed here are some most relevant examples of open-addressing hashing algorithms:

Linear probing—if the slot is taken move to the next slot (interval may be greater than 1) until an empty slot is found. Linear probing is very simple to implement and has good cache hit ratios but both inserts and lookup can be expensive when utilization is high.

Cuckoo hashing—uses two hash functions to map each entry to two possible slots. If both slots are taken, then the existing entry is move to its alternative slot. This algorithm is very efficient for searches but inserts are expensive when utilization is high. Another disadvantage of cuckoo hashing is that iterators are invalidated on every insert.

There are additional hashing algorithms used in open addressing, some that concepts from linear probing and Cuckoo hashing.

The illustrative embodiments provide an open-addressing probing barrier that benefits both performance and capacity utilization in associated with different types hashing algorithms in a hash-based key-value storing mechanism. While the proposed open-addressing probing barrier may be implement with any type of a hash-based key-value storing mechanism, the Wowing describes the open-addressing probing barrier in association with the linear probing algorithm as one example and is not intended to be exhaustive or limited to the invention in the form disclosed. In the illustrative embodiments, a probing barrier N, which is a user-configurable constant number, limits a probing process for a particular item. N is chosen based on the capacity and performance of the container. For example, if a probing process, i.e. a find operation) beings at slot Si. Then, if for example the probing barrier N is 3, the probing process will scan slot Si and the three following slots until the desired item is identified or not found. Once the fourth slot is reached and the desired item is not found, then the probing process ends.

However, in one illustrative embodiment, the probing barrier may be breached if a scan barrier bit is set. The scan barrier is a single bit that is added to an entry in the open-addressing hash table that behaves as a probing exemption barrier. That is, if in the original insertion of the item the probing barrier N was breached, i.e. the item was inserted in a slot that was past the probing barrier N from the hashed starting slot, then a scan barrier is set a $Si+ (N-1)$. Thus, if, in probing for an item, the fourth slot is reached without finding the desired item and the scan barrier bit is not set, then the probing process ends, i.e. the previously inserted item never crossed the probing barrier and therefore the probing stops. However, if, in probing for an item, the fourth slot is reached without finding the desired item and the scan barrier bit is set, then probing persists until an empty slot is reach or until all slots have been probed.

In another illustrative embodiment, the extended probing, i.e. the probing when an item is not found and the scan barrier bit is set, may be canceled using an extended probing barrier such as, for example, a multiple of N, e.g. 2N, 3N, 4N, or the like, any number larger than N, e.g, probing barrier equals N and extended probing barrier equals N+M, or any other method of having an extended probing barrier that is greater than the probing barrier N. The following examples utilize an extended probing barrier of 2N, In the previous embodiment, if $Si+N$ is reached and the scan barrier bit is set, then probing persists until an empty slot is reach or until all slots have been probed. In this embodiment, if $Si+N$ is reached and the probing barrier is set, then probing persist only until an empty slot is reach or when $Si+2N$ is reached in order to further improve performance and capacity. In both embodiments, if an empty slot is reach, if all slots have been probed (first embodiment), or if $Si+2N$ slots have been probed (second embodiment), then a miss is returned. If the desired item is found, then the item is returned. While the illustrative embodiments illustrate only two probing barriers, the illustrative embodiments are not limited to only these embodiments. That is, there may be more than two probing barriers and spacing between probing barriers is not required to be linear.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present, To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Thus, the illustrative embodiments may be utilized in many different types of data processing environments. In order to provide a context for the description of the specific elements and functionality of the illustrative embodiments, FIG. 1 is provided hereafter as example environments in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

As shown in FIG. 1, one or more of the computing devices may be specifically configured to implement an open-addressing probing barrier. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates open-addressing probing barriers.

The mechanisms of the illustrative embodiments utilize specifically configured computing devices, or data processing systems, to perform the operations for open-addressing probing barriers. These computing devices, or data processing systems, may comprise various hardware elements which are specifically configured, either through hardware configuration, software configuration, or a combination of hardware and software configuration, to implement one or more of the systems/subsystems described herein. FIG. 1 is a block diagram of just one example data processing system in Which aspects of the illustrative embodiments may be implemented. Data processing system 100 is an example of a computer in which computer usable code or instructions implementing the processes and aspects of the illustrative embodiments of the present invention may be located and/or executed so as to achieve the operation, output, and external effects of the illustrative embodiments as described herein.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM eServer™ System p® computer system, Power™ processor based computer system, or the like, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

As mentioned above, in some illustrative embodiments the mechanisms of the illustrative embodiments may be implemented as application specific hardware, firmware, or the like, application software stored in a storage device, such as HDD 126 and loaded into memory, such as main memory 108, for executed by one or more hardware processors, such as processing unit 106, or the like. As such, the computing device shown in FIG. 1 becomes specifically configured to implement the mechanisms of the illustrative embodiments and specifically configured to perform the operations and generate the outputs described hereafter with regard to the open-addressing probing barrier.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system tiles and/or user-generated data, for example. Essentially, data processing system 100 may be any known or later developed data processing system without architectural limitation.

Figures 2, 3:
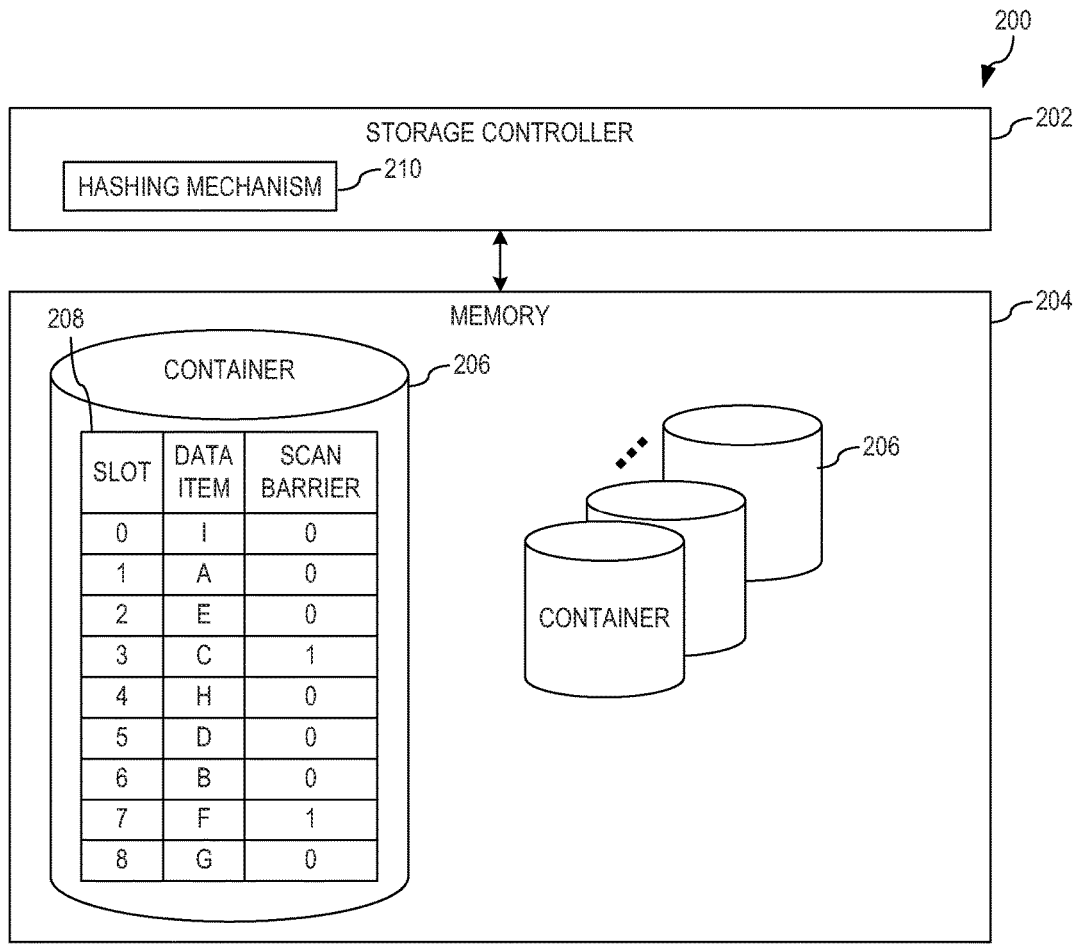
FIG. 2 depicts a functional block diagram of a mechanism that implements an open-addressing probing barrier schema in accordance with an illustrative embodiment.
FIG. 3 depicts a logical representation of the physical storage of items in a memory container in accordance with an illustrative embodiment.

FIG. 2 depicts a functional block diagram of a mechanism that implements an open-addressing probing barrier schema in accordance with an illustrative embodiment. Data processing system 200, Which may be a data processing system such as data processing system 100 in FIG. 1, comprises memory controller 202 controlling a plurality of memory containers 206 within a memory 204, such as a random access memory (RAM), a read-only memory (ROM), an erasable programmable read-only memory (EPROM or Flash memory), or the like. Each memory container 206 comprises a plurality of memory slots 208, where each memory slot 208 has one of three states:

Used/Occupied—an item is currently occupying memory slot 208,

Empty—no item was ever placed in memory slot 208, or

Deleted—there was an item in memory slot 208 in the past but the item has been deleted from memory slot 208 and memory slot 208 may now be used for a new item.

When memory container 206 is first initialized, all memory slots 208 in the memory container 206 are empty. Thus, there are three basic operations to consider for each memory slot 208: insert (write), find (read), and delete. Each of the operations in association with the open-addressing probing barrier schema is described as follows. With regard to the insert operation and also referring to FIG. 3, which is a logical representation of the physical storage of items in memory container 206 in accordance with an illustrative embodiment, in the insert operation, memory controller 202 executes a hashing mechanism 210 the computes a starting memory slot to insert the item. For example, for item A, hashing mechanism 210 computes a starting slot 1 and memory controller 202 probes memory slot 1 to determine whether an item already occupies in memory slot 1. If no item already occupies memory slot 1, then memory controller 202 inserts item A in memory slot 1, Continuing with the example, for item B, hashing mechanism 210 computes a starting slot 6 and memory controller 202 probes memory slot 6 to determine whether an item already occupies in memory slot 6. If no item already occupies memory slot 6, then memory controller 202 inserts item B in memory slot 6. For item C, hashing mechanism 210 computes a starting slot 3 and memory controller 202 probes memory slot 3 to determine whether an item already occupies in memory slot 3. If no item already occupies memory slot 3, then memory controller 202 inserts item C in memory slot 3. For item D, hashing mechanism 210 computes a starting slot 5 and memory controller 202 probes memory slot 5 to determine whether an item already occupies in memory slot 5. If no item already occupies memory slot 5, then memory controller 202 inserts item D in memory slot 5.

Thus far, all of the insert operations have been regular since no item already occupies the hashed memory slot. However, the following illustrates the use of the probing barrier N and the scan barrier bit. The following utilizes a probing barrier N where N is equal to 2. Continuing with the example, for item E, hashing mechanism 210 computes a starting slot 1 and memory controller 202 probes memory slot 1 to determine whether an item already occupies in memory slot 1, which is storing item A in this example. Since memory slot 1 is storing item A, memory controller 202 keeps probing until a first empty memory slot is reached or until $S_i+N$ memory slots are probed. Thus, in this example, memory controller 202 probes memory slot 2 and, since memory slot 2 is empty, memory controller 202 inserts item E in memory slot 2. For item F, hashing mechanism 210 computes a starting slot 6 and memory controller 202 probes memory slot 6 to determine whether an item already occupies in memory slot 6, which is storing item B in this example. Since memory slot 6 is storing item B, memory controller 202 keeps probing until a first empty memory slot is reached or until $S_i+N$ memory slots are probed. Thus, in this example, memory controller 202 probes memory slot 7 and, since memory slot 7 is empty, memory controller 202 inserts item F in memory slot 7. For item G, hashing mechanism 210 computes a starting slot 7 and memory controller 202 probes memory slot 7 to determine whether an item already occupies in memory slot 7, which is storing item F in this example. Since memory slot 7 is storing item F, memory controller 202 keeps probing until a first empty memory slot is reached or until $S_i+N$ memory slots are probed. Thus, in this example, memory controller 202 probes memory slot 8 and, since memory slot 8 is empty, memory controller 202 inserts item G in memory slot 8.

The following examples illustrates cases where memory controller 202 enables the scan barrier of the illustrative embodiments, i.e. sets the scan barrier since no open memory slot occurs in the hashed memory slot Si or Si+N memory slots after the hashed memory slot. For item It hashing mechanism 210 computes a starting slot 1 and memory controller 202 probes memory slot 1 to determine whether an item already occupies in memory slot 1, which is storing item A in this example. Since memory slot 1 is storing item A, memory controller 202 keeps probing until a first empty memory slot is reached or until $S_i+N$ memory slots are probed. However, since memory slot 2 is storing item F and memory slot 3 is storing item C, the probing barrier of Si+N (1+2) would cause the probing to cease at memory slot 3. Therefore, in order to continue with the insert for item H, memory controller 202 enables the scan barrier at memory slot 3, which allows the probing to proceed past the probing barrier of N where N is equal to 2. Memory controller 202 then probes memory slot 4 and, since memory slot 4 is empty, memory controller 202 inserts item H in memory slot 4.

As another example where memory controller 202 enables the scan barrier, for item I, hashing mechanism 210 computes a starting slot 5 and memory controller 202 probes memory slot 5 to determine whether an item already occupies in memory slot 5, which is storing item D in this example. Since memory slot 5 is storing item D, memory controller 202 keeps probing until a first empty memory slot is reached or until $S_i+N$ memory slots are probed. However, since memory slot 6 is storing item B and memory slot 7 is storing item F, the probing barrier of Si+N (1+2) would cause the probing to cease. In order to continue with the insert for item I, memory controller 202 enables the scan barrier at memory slot 7, which allows the probing to proceed past the probing barrier of N where N is equal to 2. Memory controller 202 then probes memory slot 8, which is storing item G. Since memory slot 8 is the last memory slot this example, memory controller 202 returns to the start of memory container 206, i.e. memory slot 0. Memory controller 202 then probes memory slot 0 and, since memory slot 0 is empty, memory controller 202 inserts item I in memory slot 0.

With regard to the find operation, if item A is to be read from memory container 206, memory controller 202 executes a hashing mechanism 210 for item A that computes the starting memory slot to find item A. For example, for item A, hashing mechanism 210 computes a starting slot 1. From the starting slot 1, memory controller 202 probes until the first of the following occurs:
 i. The requested item is found, which, if found, memory controller 202 returns the found item;
 ii. An empty memory slot is reached, which, if identified, memory controller 202 returns that the item does not exist;
 iii. The $S_i+N$ memory slot is reached and the "barrier" bit is not set, which, if reached, memory controller 202 returns that the item does not exist; or
 iv. The $S_i+N$ memory slot is reached and the "barrier" bit is set, which, if reached, memory controller 202 continues to probe until either all of the memory slots have been examined or, responsive to an extended probing barrier being utilized, Si+2N is reached. If an empty slot is reach during the extended probing or if all slots have been probed (first embodiment) and the item is not found or if Si+2N slots have been probed (second embodiment) and the item is not found, memory controller 202 returns that the item does not exist. If the desired item is round, memory controller 202 returns that item.

Thus, in the present example, since item A exists in memory slot 1, then memory controller 202 would only reach the first of the probing step in the list above and return item A. The same process would occur for items B, C, and D.

For item E, hashing mechanism 210 computes a starting slot 1, From the starting slot 1, memory controller 202 probes memory slot 1, which is storing item A. Therefore, memory controller 202 moves to the other probing steps in which no empty memory slots are reached and $S_i+N$ memory slots are probed. In this example, memory controller 202 probes memory slot 2 and, since memory slot 2 is storing item memory controller 202 returns item F. For item F, hashing mechanism 210 computes a starting slot 6. From the starting slot 6, memory controller 202 probes memory slot 6, which is storing item B. Therefore, memory controller 202 moves to the other probing steps in which no empty memory slots are reached and $S_i+N$ memory slots are probed. In this example, memory controller 202 probes memory slot 7 and, since memory slot 7 is storing item F, memory controller 202 returns item F. For item G, hashing mechanism 210 computes a starting slot 7, Front the starting slot 7, memory controller 202 probes memory slot 7, which is storing item F. Therefore, memory controller 202 moves to the other probing steps in which no empty memory slots are reached and $S_i+N$ memory slots are probed. In this example, memory controller 202 probes memory slot 8 and, since memory slot 8 is storing item G, memory controller 202 returns item G. It should be noted that if an empty memory slot is reached during the probing of Si+N memory slots, memory controller 202 would return a response that the item does not exist. Further is the Si+N memory slot is reached and the probing barrier is not set at the Si+N memory slot, then memory controller 202 would return a response that the item does not exist.

For item H, hashing mechanism 210 computes a starting slot 1. From the starting slot 1, memory controller 202 probes memory slot 1, which is storing item A. Therefore, memory controller 202 moves to the other probing steps in which no empty memory slots are reached and $S_i+N$ memory slots are probed. In this example, memory controller 202 probes memory slot 2 that is storing item E and memory slot 3 that is storing item C. Since memory slot 3 is equivalent to the Si+N for the starting slot calculated for item H, memory controller 202 moves to the final probing step in which. memory controller 202 determines whether the barrier bit is set. In this example, if the barrier bit is not set in associated with memory slot 3, then then memory controller 202 would return a response that the item does not exist. However, since in this example, the barrier bit is set at memory slot 3, memory controller 202 continues to probe at memory slot 4. In this example, memory controller 202 probes memory slot 4 and, since memory slot 4 is storing item H, memory controller 202 returns item H.

Similarly for item I, hashing mechanism 210 computes a starting slot 5. From the starting slot 5, memory controller 202 probes memory slot 5, which is storing item D. Therefore, memory controller 202 moves to the other probing steps in which no empty memory slots are reached and $S_i+N$ memory slots are probed. In this example, memory controller 202 probes memory slot 6 that is storing item B and memory slot 7 that is storing item F. Since memory slot 7 is equivalent to the Si+N for the starting slot calculated for item I, memory controller 202 moves to the final probing step in which memory controller 202 determines whether the barrier bit is set. In this example, the barrier bit is set at memory slot 7, thus memory controller 202 continues to probe at memory slot 8 that is storing item G. Since memory slot 8 is the last memory slot in this example, memory controller 202 returns to the start of memory container 206, i.e. memory slot 0. Memory controller 202 probes memory slot 0 and, since memory slot 0 is storing item I, memory controller 202 returns item I. Thus, in the find operation, probing only continues after the Si+N probing barrier is reached only when the barrier bit that is set during insertion is set, which improves performance and utilization.

In the delete operation a similar operation is performed to that of the find operation. That is, in the delete operation and once hashing mechanism determined the starting slot, memory controller 202 probes until the first of the following occurs:
  i. The requested item is found, which, if found, memory controller 202 marks the memory slot as deleted;
  ii. An empty memory slot is reached, which, if identified, memory controller 202 returns that the item does not exist;
  iii. The $S_i+N$ memory slot is reached and the "barrier" bit is not set, which, if reached, memory controller 202 returns that the item does not exist; or
  iv. The $S_i+N$ memory slot is reached and the "barrier" bit is set, which, if reached, memory controller 202 continues to probe until either all of the memory slots have been examined or, responsive to an extended probing barrier being utilized, Si+2N is reached. If an empty slot is reach during the extended probing or if all slots have been probed (first embodiment) and the item is not found or if Si+2N slots have been probed (second embodiment) and the item is not found, memory controller 202 returns that the item does not exist. If the desired item is found, memory controller 202 marks the memory slot as deleted.

So as to provide examples of these steps, if item A is being to be deleted from memory container 206, memory controller 202 executes a hashing mechanism 210 for item A that computes the starting memory slot to find item A. For example, for item A, hashing mechanism 210 computes a starting slot 1. Memory controller 202 probes memory slot 1 and since item A exists in memory slot 1, memory controller 202 would only reach the first of the probing step in the list above and delete item A. The same process would occur for items B, C, and D.

For item E, hashing mechanism 210 computes a starting slot 1. From the starting slot 1, memory controller 202 probes memory slot 1, which is storing item A. Therefore, memory controller 202 moves to the other probing steps in which no empty memory slots are reached and $S_i+N$ memory slots are probed, In this example, memory controller 202 probes memory slot 2 and, since memory slot 2 is storing item E, memory controller 202 would delete item E. For item F, hashing mechanism 210 computes a starting slot 6. From the starting slot 6, memory controller 202 probes memory slot 6, which is storing item B. Therefore, memory controller 202 moves to the other probing steps in which no empty memory slots are reached and $S_i+N$ memory slots are probed. In this example, memory controller 202 probes memory slot 7 and, since memory slot 7 is storing item F, memory controller 202 would delete item F. For item G, hashing mechanism 210 computes a starting slot 7. From the starting slot 7, memory controller 202 probes memory slot 7, which is storing item F. Therefore, memory controller 202 moves to the other probing steps in which no empty memory slots are reached and $S_i+N$ memory slots are probed. In this example, memory controller 202 probes memory slot 8 and, since memory slot 8 is storing item G, memory controller 202 would delete item G. It should be noted that if an empty memory slot is reached during the probing of Si+N memory slots, memory controller 202 would return a response that the item does not exist. Further is the Si+N memory slot is reached and the probing barrier is not set at the Si+N memory slot, then memory controller 202 would return a response that the item does not exist.

For item H, hashing mechanism 210 computes a starting slot 1. From the starting slot 1, memory controller 202 probes memory slot 1, which is storing item A. Therefore, memory controller 202 moves to the other probing steps in which no empty memory slots are reached and $S_i+N$ memory slots are probed. In this example, memory controller 202 probes memory slot 2 that is storing item E and memory slot 3 that is storing item C. Since memory slot 3 is equivalent to the Si+N for the starting slot calculated for item H, memory controller 202 moves to the final probing step in which memory controller 202 determines whether the barrier bit is set. In this example, if the barrier bit is not set in associated with memory slot 3, then then memory controller 202 would return a response that the item does not exist. However, since in this example, the harrier bit is set at memory slot 3, memory controller 202 continues to probe at memory slot 4. In this example, memory controller 202 probes memory slot 4 and, since memory slot 4 is storing item H, memory controller 202 would delete item H. It should be noted that, when an item is deleted for which a barrier bit has been set, the barrier bit is reset.

Similarly for item I, hashing mechanism 210 computes a starting slot 5. From the starting slot 5, memory controller 202 probes memory slot 5, which is storing item D. Therefore, memory controller 202 moves to the other probing steps in which no empty memory slots are reached and $S_i+N$ memory slots are probed. In this example, memory controller 202 probes memory slot 6 that is storing item B and memory slot 7 that is storing item F. Since memory slot 7 is equivalent to the Si+N for the starting slot calculated for item I, memory controller 202 moves to the final probing step in which memory controller 202 determines whether the barrier bit, is set. In this example, the barrier bit is set at memory slot 7, thus memory controller 202 continues to probe at memory slot 8 that is storing item G. Since memory slot 8 is the last memory slot in this example, memory controller 202 returns to the start of memory container 206, i.e. memory slot 0. Memory controller 202 probes memory slot 0 and, since memory slot 0 is storing item I, memory controller 202 would delete item I. Thus, in the find operation, probing only continues after the Si+N probing barrier is reached only when the barrier bit that is set during insertion is set, which improves performance and utilization.

It should be noted that, when an item is deleted for which a barrier bit has been set, the barrier bit is reset.

Note that the number of deleted slot and the number of empty slots has a direct impact of the depth of the probing. To work efficiently, occupancy cannot be more than 70%-80%. Even if there are deleted slots, the presence of empty slots is the key factor in determining the depth. Over time the number of empty slots is reduced and therefore an eventual rehash is inevitable. The rehash repacks all the items and return deleted slots to the empty state.

Figure 4:
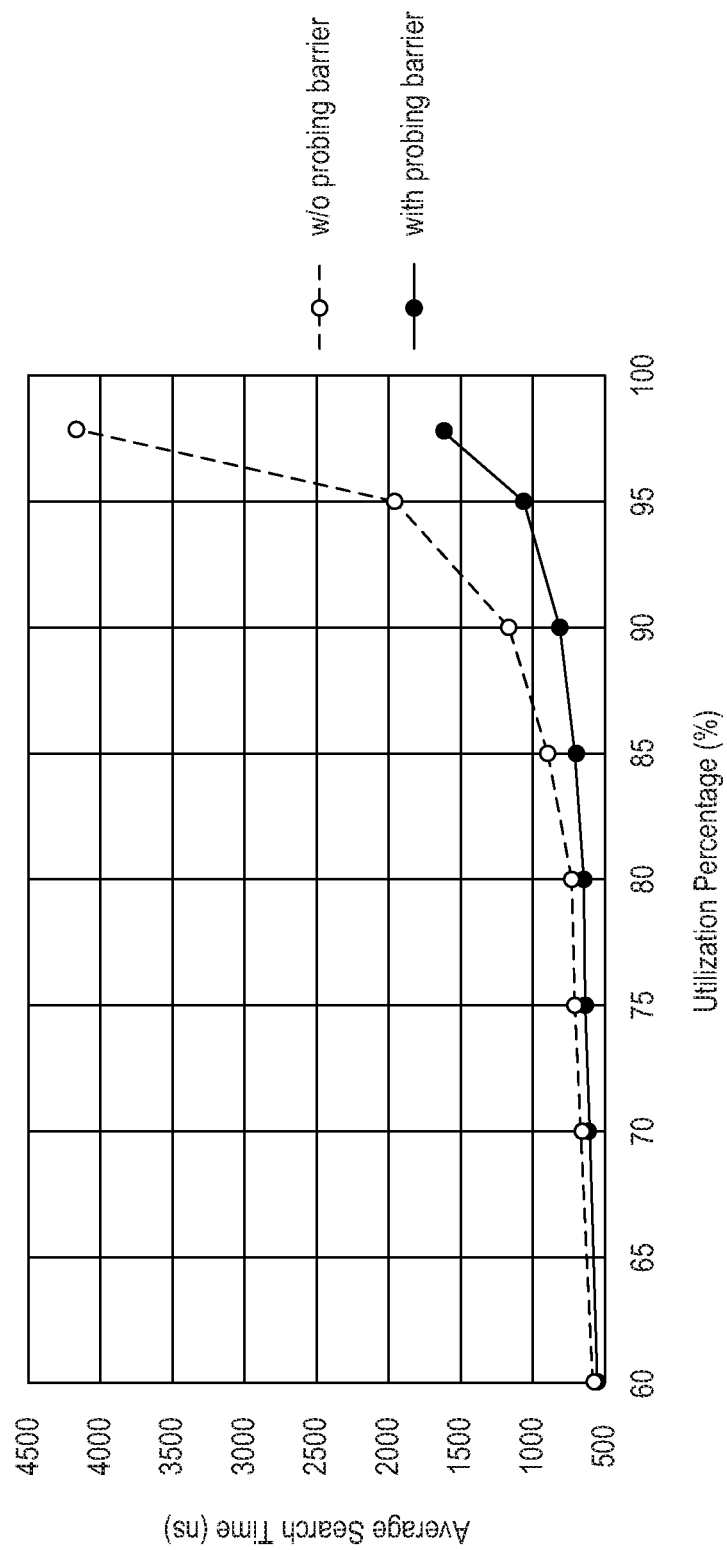
FIG. 4 depicts a graph of search times (in nanoseconds) versus utilization percentage for probes without the scan barrier and probes with a scan barrier in accordance with an illustrative embodiment.

Before the implementation of probing barrier(s) and barrier bits as in previous memory implementations, the number of deleted slots and the number of empty slots had a direct impact on the depth of the probing. Thus, in previous implementations, when there are multiple non-empty consecutive slots, probing must continue potentially for the full length of the memory container. However, in the illustrative embodiments, probing is only continued for Si+N memory slots and after that point only when the barrier bit is set. FIG. 4 depicts a graph of search times (in nanoseconds) versus utilization percentage for probes without the scan barrier and probes with a scan barrier in accordance with an illustrative embodiment. As is illustrated in FIG. 4, results are shown in previous implementations shown by the dashed line that, with increasing the utilization percent, average search times dramatically increase. However, with the illustrative embodiments, average search times do not increase as much as utilization increases.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
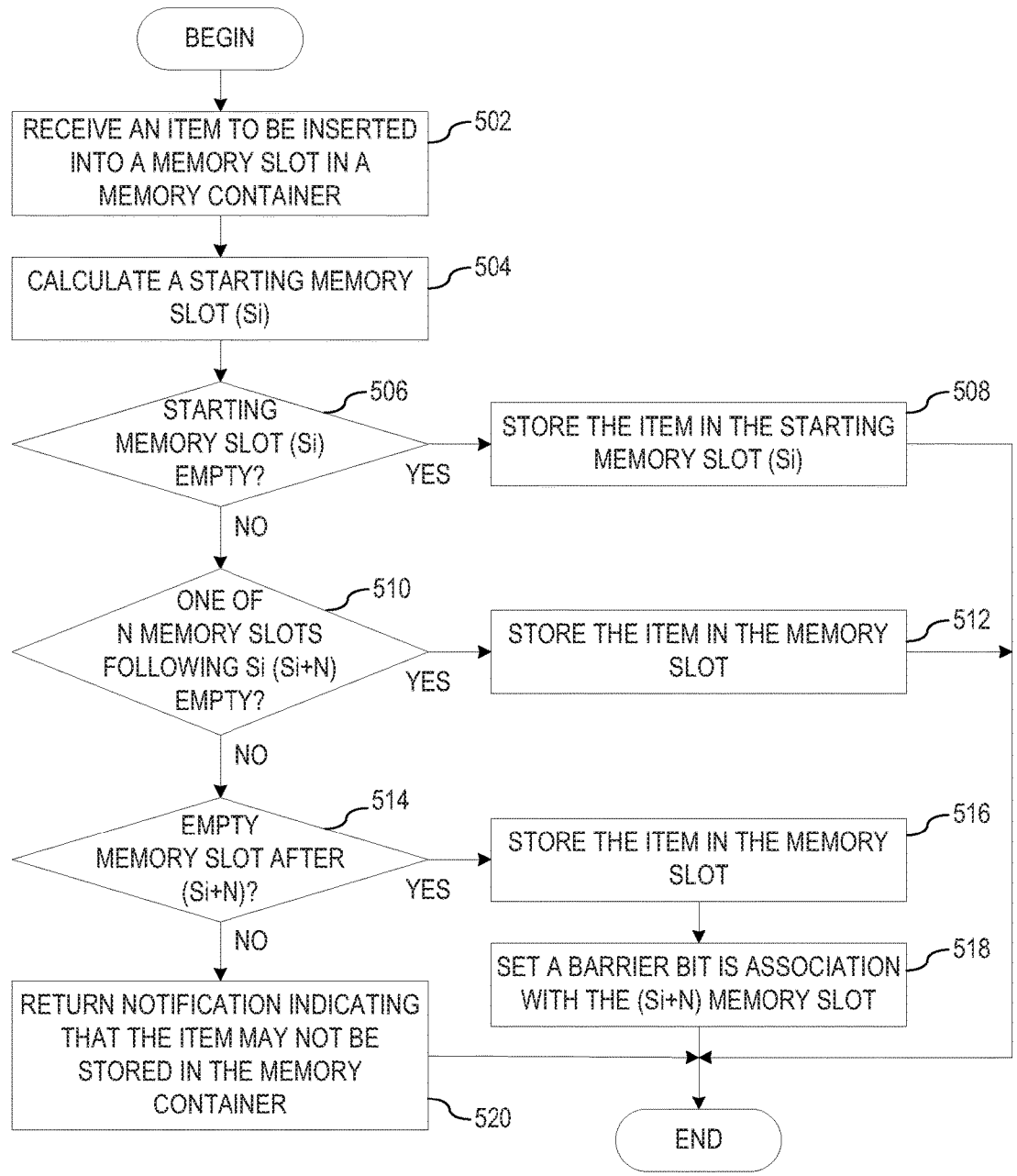
FIG. 5 depicts an exemplary flow diagram of an insertion operation performed by an open-addressing probing barrier mechanism in accordance with an illustrative embodiment.

FIG. 5 depicts an exemplary flow diagram of an insertion operation performed by an open-addressing probing barrier mechanism in accordance with an illustrative embodiment. As the operation begins, the mechanism receives a request from an application to insert, write, or the like, an item into a memory slot in a memory container (step 502). The mechanism calculates a starting memory slot (Si) by calculating a hash value for the item (step 504). Utilizing the starting memory slot (Si), the mechanism determines whether the starting memory slot (Si) is empty in the memory container (step 506). If at step 506 the mechanism determines that the starting memory slot (Si) is empty, then the mechanism stores the item in the starting memory slot (Si) (step 508), with the operation terminating thereafter.

If at step 506 the mechanism determines that, the starting memory slot (Si) is occupied, then the mechanism probes the immediately following N slots to identify a first empty memory slot of N memory slots in the memory container immediately following the starting memory slot (Si+N) (step 510). In the illustrative embodiments, N is a probing barrier, which is a user-configurable constant number and limits a probing process for a particular item. If at step 510 the mechanism identifies a first empty memory slot of N memory slots in the memory container immediately following the starting memory slot (Si+N), the mechanism stores the item in the first empty memory slot (step 512), with the operation terminating thereafter.

If at step 510 the mechanism fails to identify a first empty memory slot of N memory slots in the memory container immediately following the starting memory slot (Si+N), the mechanism proceeds probing the remaining memory slots following the Si+N memory slot in the memory container to identify a first empty memory slot (step 514). If at step 514 the mechanism identifies a first empty memory slot in the remaining memory slots following the Si+N memory slot in the memory container, the mechanism stores the item in the first empty memory slot (step 516). The mechanism also sets a barrier bit is association with the (Si+N) memory slot so that in later find operations and delete operations probing may proceed past probing barrier N (step 518), with the operation terminating thereafter. If at step 514 the mechanism fails to identify a first empty memory slot in the remaining memory slots following the Si+N memory slot in the memory container, the mechanism returns a notification indicating that the item may not be stored in the memory container to the application (step 520), with the operation terminating thereafter.

Figure 6:
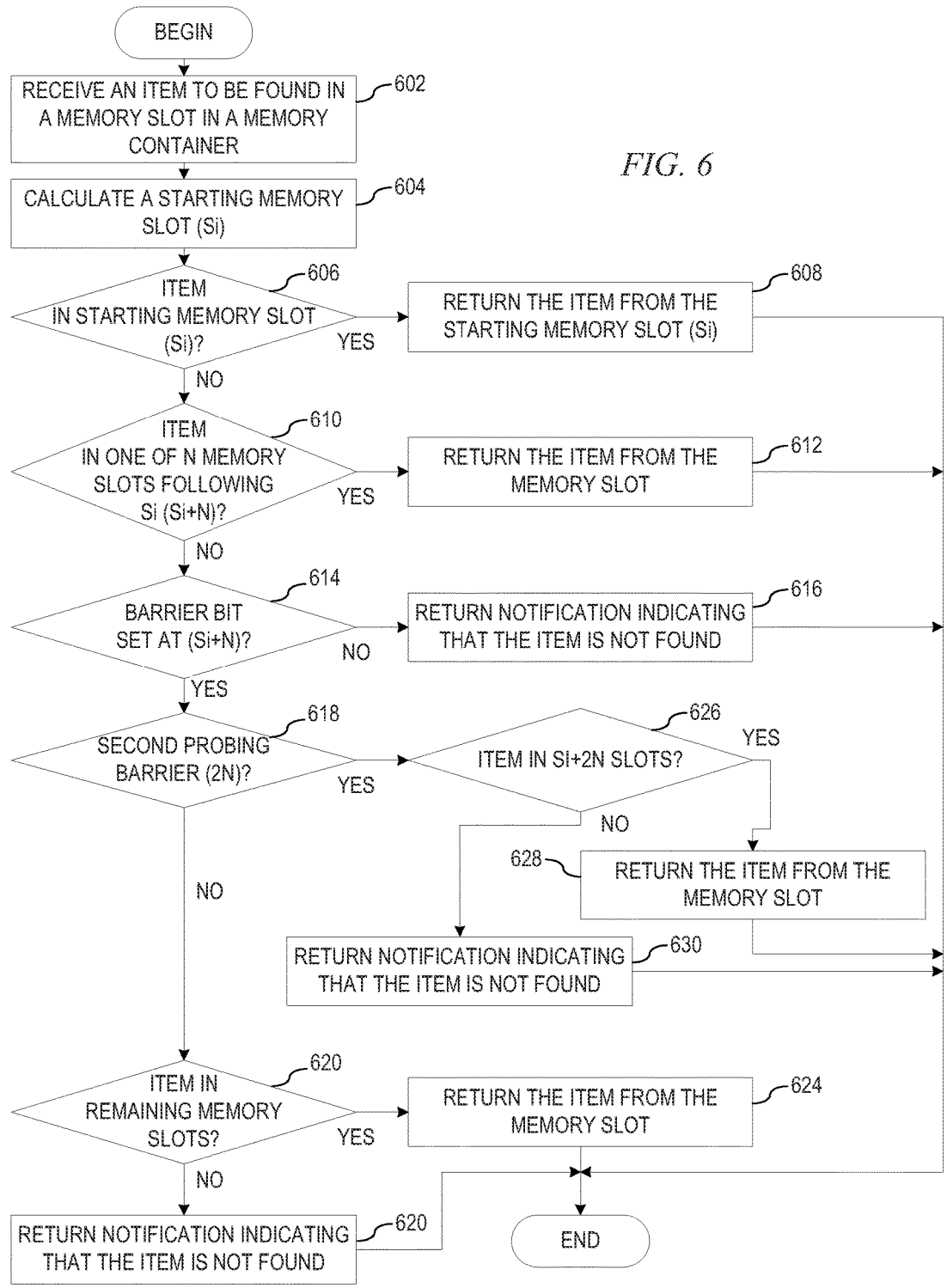
FIG. 6 depicts an exemplary flow diagram of a find operation performed by an open-addressing probing barrier mechanism in accordance with an illustrative embodiment.

FIG. 6 depicts an exemplary flow diagram of a find operation performed by an open-addressing probing barrier mechanism in accordance with an illustrative embodiment. As the operation begins, the mechanism receives a request from an application to find, read, or search for an item in a memory container (step 602). The mechanism calculates a starting memory slot (Si) by calculating a hash value for the item (step 604). Utilizing the starting memory slot (Si), the mechanism probes the starting memory slot (Si) to determine whether the item is in the memory slot (step 606). If at step 606 the mechanism determines that the item occupies the starting memory slot (Si), then the mechanism returns the item from the starting memory slot (Si) to the application (step 608), with the operation terminating thereafter.

If at step 606 the mechanism determines that the item fails to occupy the starting memory slot (Si), then the mechanism, then the mechanism probes the immediately following N slots to identify whether the item occupies one of the N memory slots in the memory container immediately following the starting memory slot (Si+N) (step 610). In the illustrative embodiments, N is a probing barrier, which is a user-configurable constant number and limits a probing process for a particular item. If at step 610 the mechanism identifies the item in one of the N memory slots in the memory container immediately following the starting memory slot (Si+N), the mechanism returns the item from the memory slot to the application (step 612), with the operation terminating thereafter.

If at step 610 the mechanism fails to identify the item in one of the N memory slots in the memory container immediately following the starting memory slot (Si+N), the mechanism determines whether a barrier bit is set in association with the (Si+N) memory slot (step 614). If at step 614 the mechanism determines that a barrier bit fails to be set in association with the (Si+N) memory slot, the mechanism returns a notification indicating the item does not exist to the application (step 616), with the operation terminating thereafter. If at step 614 the mechanism determines that the barrier bit is set in association with the (Si+N) memory slot, the mechanism determines whether there is a second probing barrier (2N) in association with the memory container (step 618). If at step 618 the mechanism determines that there is no second probing barrier (2N), the mechanism probes all remaining memory slots for the item (step 620). If at step 620 the mechanism finds the item, the mechanism returns the item from the memory slot to the application (step 622), with the operation terminating thereafter. If at step 620 the mechanism fails to find the item, the mechanism returns a notification indicating the item does not exist to the application (step 624), with the operation terminating thereafter.

If at step 618 the mechanism determines that there is a second probing barrier (2N), the mechanism probes the immediately following 2N slots to identify whether the item occupies one of the N memory slots in the memory container immediately following the starting memory slot (Si+2N) (step 626). If at step 626 the mechanism identifies the item in one of the 2N memory slots in the memory container immediately following the starting memory slot (Si+2N), the mechanism returns the item from the memory slot to the application (step 628), with the operation terminating thereafter. If at step 626 the mechanism fails to identify the item in one of the 2N memory slots in the memory container immediately following the starting memory slot (Si+2N), the mechanism returns a notification indicating the item does riot exist to the application (step 630), with the operation terminating thereafter.

Figure 7:
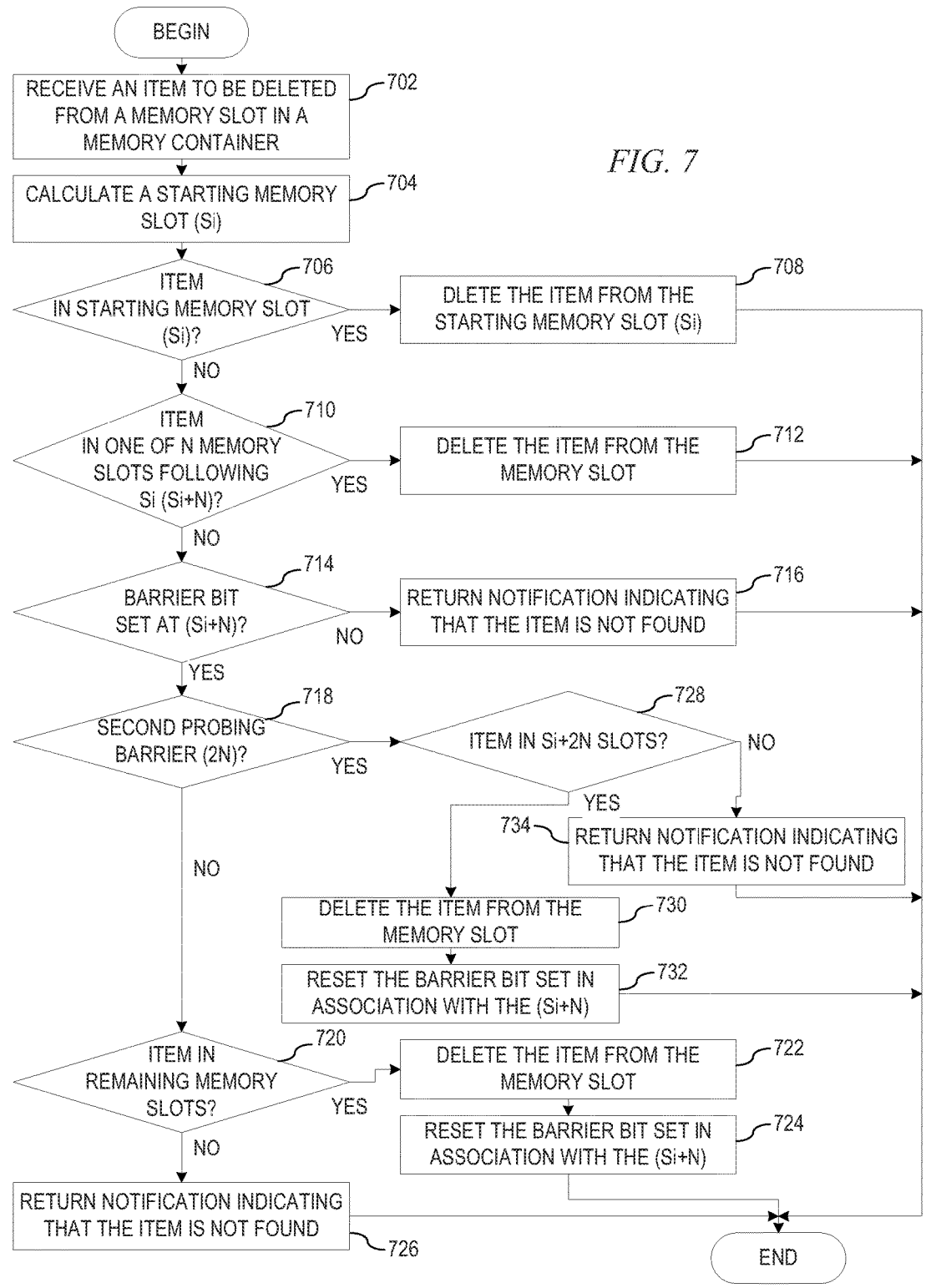
FIG. 7 depicts an exemplary flow diagram of a delete operation performed by an open-addressing probing barrier mechanism in accordance with an illustrative embodiment.

FIG. 7 depicts an exemplary flow diagram of a delete operation performed by an open-addressing probing barrier mechanism in accordance with an illustrative embodiment. As the operation begins, the mechanism receives a request from an application to delete an item in a memory container (step 702), The mechanism calculates a starting memory slot (Si) by calculating a hash value for the item (step 704). Utilizing the starting memory slot (Si), the mechanism probes the starting memory slot (Si) to determine whether the item is in the memory slot (step 706). If at step 706 the mechanism determines that the item occupies the starting memory slot (Si), then the mechanism deletes the item from the starting memory slot (Si) (step 708), with the operation terminating thereafter.

If at step 706 the mechanism determines that the item fails to occupy the starting memory slot (Si), then the mechanism, then the mechanism probes the immediately following N slots to identify whether the item occupies one of the N memory slots in the memory container immediately following the starting memory slot (Si+N) (step 710). In the illustrative embodiments, N is a probing barrier, which is a user-configurable constant number and limits a probing process for a particular item. If at step 710 the mechanism identifies the item in one of the N memory slots in the memory container immediately following the starting memory slot (Si+N), the mechanism deletes the item from the memory slot (step 712), with the operation terminating thereafter.

If at step 710 the mechanism fails to identify the item in one of the N memory slots in the memory container immediately following the starting memory slot (Si+N), the mechanism determines whether a barrier bit is set in association with the (Si+N) memory slot (step 714). If at step 714 the mechanism determines that a barrier bit fails to be set in association with the (Si+N) memory slot, the mechanism returns a notification indicating the item does not exist to the application (step 716), with the operation terminating thereafter. If at step 714 the mechanism determines that the barrier bit is set in association with the (Si+N) memory slot, the mechanism determines whether there is a second probing barrier (2N) in association with the memory container (step 718). If at step 718 the mechanism determines that there is no second probing barrier (2N), the mechanism probes all remaining memory slots for the item (step 720). If at step 720 the mechanism finds the item, the mechanism deletes the item from the memory slot (step 722) and resets the barrier bit set in association with the (Si+N) memory slot (step 724), with the operation terminating thereafter. If at step 720 the mechanism fails to find the item, the mechanism returns a notification indicating the item does not exist to the application (step 726), with the operation terminating thereafter.

If at step 718 the mechanism determines that there is a second probing barrier (2N), the mechanism probes the immediately following 2N slots to identify whether the item occupies one of the N memory slots in the memory container immediately following the starting memory slot (Si+2N) (step 728). If at step 728 the mechanism identifies the item in one of the 2N memory slots in the memory container immediately following the starting memory slot (Si+2N), the mechanism deletes the item from the memory slot (step 730) and resets the barrier bit set in association with the (Si+N) memory slot (step 732), with the operation terminating thereafter. If at step 728 the mechanism fails to identify the item in one of the 2N memory slots in the memory container immediately following the starting memory slot (Si+2N), the mechanism returns a notification indicating the item does not exist to the application (step 734), with the operation terminating thereafter.

The flowchart and block diagrams in the Figures illustrate the architecture, functionality, and operation of possible implementations of systems, methods, and. computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for an open-addressing probing barrier that benefits both performance and capacity utilization associated with different types hashing algorithms in a hash-based key-value storing mechanism. The open-addressing probing barrier schema utilized in the illustrative embodiments provide for better performance of all operations, higher occupancy utilization, a reduction of the number of rehashes required, full cache locality, minor memory overhead, configurability in the number of barriers, spacing between barriers, or the like, and inserts that do not rehash do not invalidate iterators.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for utilizing an open address probing barrier in association with a memory container, the method comprising:
   responsive to receiving a request from an application to find an item in the memory container, calculating a starting memory slot for the item;
   responsive to the item failing to occupy the starting memory slot, probing a first predetermined number of memory slots immediately following the starting memory slot for the item;
   responsive to the item occupying one of the first predetermined number of memory slots immediately following the starting memory slot, returning the item to the application;
   responsive to the item failing to occupy one of the first predetermined number of memory slots immediately following the starting memory slot, determining whether a barrier bit has been set in association with the last of the first predetermined number of memory slots;
   responsive to the barrier bit being set, probing at least a portion of the memory container for the item and, responsive to the item being found in the portion of the memory container, returning the item to the application;
   responsive to the barrier bit failing to be set, returning a notification that the item does not exist in the memory container to the application;
   responsive to receiving a request to insert the item in one of the plurality of memory slots in the memory container, calculating the starting memory slot for the item;
   responsive to the starting memory slot being empty, storing the item in the starting memory slot;
   responsive to the starting memory slot being occupied, probing the first predetermined number of memory slots immediately following the starting memory slot for the item;
   responsive to one of the first predetermined number of memory slots immediately following the starting memory slot being empty, storing the item in the empty memory slot;
   responsive to all of the first predetermined number of memory slots immediately following the starting memory slot being occupied, probing at least the portion of the memory container for an empty memory slot;
   responsive to the empty memory slot being identified, storing the item in the empty memory slot and setting the barrier bit has been set in association with the last of the first predetermined number of memory slots;
   responsive to the empty memory slot failing to be identified, returning a notification that the item cannot be stored in the memory container to the application.

2. The method of claim 1, wherein the portion of the memory container is all un-probed memory slots of the memory container.

3. The method of claim 1, wherein the portion of the memory container is a second predetermined number of memory slots immediately following the starting memory slot and wherein the method further comprises:
   responsive to the item occupying one of the second predetermined number of memory slots immediately following the starting memory slot, returning the item to the application; and
   responsive to the item failing to occupy one of the second predetermined number of memory slots immediately following the starting memory slot, returning a notification that the item does not exist in the memory container to the application.

4. The method of claim 1, further comprising:
   responsive to the item occupying the starting memory slot, returning the item from the starting memory slot to the application.

5. The method of claim 1, wherein the starting memory slot is calculated using a hash algorithm.

6. The method of claim 1, wherein the portion of the memory container is all un-probed memory slots of the memory container.

7. The method of claim 1, wherein the portion of the memory container is a second predetermined number of memory slots immediately following the starting memory slot and wherein the method further comprises:
   responsive to the identifying an empty slot in one of the second predetermined number of memory slots immediately following the starting memory slot, storing the item in the empty memory slot; and
   responsive to a failure to identify an empty slot in one of the second predetermined number of memory slots immediately following the starting memory slot, returning a notification that the item cannot be stored in the memory container to the application.

8. The method of claim 1, wherein the item is deleted from one of a plurality of memory slots in the memory container by the method comprising:
   responsive to receiving a request to delete an item in the memory container, calculating the starting memory slot for the item;
   responsive to the item failing to occupy the starting memory slot, probing the first predetermined number of memory slots immediately following the starting memory slot for the item;
   responsive to the item occupying one of the first predetermined number of memory slots immediately following the starting memory slot, deleting the item from the memory slot;
   responsive to the item failing to occupy one of the first predetermined number of memory slots immediately following the starting memory slot, determining whether the barrier bit has been set in association with the last of the first predetermined number of memory slots;
   responsive to the barrier bit being set, probing at least the portion of the memory container for the item and, responsive to the item being found in the portion of the memory container, deleting the item from the memory slot; and
   responsive to the barrier bit failing to be set, returning a notification that the item does not exist in the memory container to the application.

9. The method of claim 8, wherein the portion of the memory container is a second predetermined number of memory slots immediately following the starting memory slot and wherein the method further comprises:
   responsive to the item occupying one of the second predetermined number of memory slots immediately following the starting memory slot, deleting the item from the memory slot; and responsive to the item failing to occupy one of the second predetermined number of memory slots immediately following the starting memory slot, returning a notification that the item does not exist in the memory container to the application.

10. A computer program product comprising a computer readable storage medium having a computer readable program stored therein, wherein the computer readable program, when executed on a computing device, causes the computing device to:

responsive to receiving a request from an application to find an item in the memory container, calculate a starting memory slot for the item;

responsive to the item failing to occupy the starting memory slot, probe a first predetermined number of memory slots immediately following the starting memory slot for the item;

responsive to the item occupying one of the first predetermined number of memory slots immediately following the starting memory slot, return the hem to the application;

responsive to the item failing to occupy one of the first predetermined number of memory slots immediately following the starting memory slot, determine whether a barrier bit has been set in association with the last of the first predetermined number of memory slots;

responsive to the barrier bit being set, probing at least a portion of the memory container for the item and, responsive to the item being found in the portion of the memory container, return the item to the application;

responsive to the barrier bit failing to be set, return a notification that the item does not exist in the memory container to the application;

responsive to receiving a request to insert the item in one of the plurality of memory slots in the memory container, calculate the starting memory slot for the item;

responsive to the starting memory slot being empty, store the item in the starting memory slot;

responsive to the starting memory slot being occupied, probe the first predetermined number of memory slots immediately following the starting memory slot for the item;

responsive to one of the first predetermined number of memory slots immediately following the starting memory slot being empty, store the item in the empty memory slot;

responsive to all of the first predetermined number of memory slots immediately following the starting memory slot being occupied, probe at least the portion of the memory container for an empty memory slot;

responsive to the empty memory slot being identified, store the item in the empty memory slot and setting the barrier bit has been set in association with the last of the first predetermined number of memory slots;

responsive to the empty memory slot failing to be identified, return a notification that the item cannot be stored in the memory container to the application.

11. The computer program product of claim 10, wherein the portion of the memory container is all un-probed memory slots of the memory container.

12. The computer program product of claim 10, wherein the portion of the memory container is a second predetermined number of memory slots immediately following the starting memory slot and wherein the computer readable program further causes the computing device to:

responsive to the item occupying one of the second predetermined number of memory slots immediately following the starting memory slot, return the item to the application; and responsive to the item failing to occupy one of the second predetermined number of memory slots immediately following the starting memory slot, return a notification that the item does not exist in the memory container to the application.

13. The computer program product of claim 10, wherein the computer readable program further causes the computing device to:

responsive to the item occupying the starting memory slot, return the item from the starting memory slot to the application.

14. The computer program product of claim 10, wherein the portion of the memory container is all un-probed memory slots of the memory container.

15. The computer program product of claim 10, wherein the portion of the memory container is a second predetermined number of memory slots immediately following the starting memory slot and wherein the computer readable program further causes the computing device to:

responsive to the identifying an empty slot in one of the second predetermined number of memory slots immediately following the starting memory slot, store the item in the empty memory slot; and responsive to a failure to identify an empty slot in one of the second predetermined number of memory slots immediately following the starting memory slot, return a notification that the item cannot be stored in the memory container to the application.

16. The computer program product of claim 10, wherein the item is deleted from one of a plurality of memory slots in the memory container by the computer readable program further causing the computing device to:

responsive to receiving a request to delete an item in the memory container, calculate the starting memory slot for the item;

responsive to the item failing to occupy the starting memory slot, probe the first predetermined number of memory slots immediately following the starting memory slot for the item;

responsive to the item occupying one of the first predetermined number of memory slots immediately following the starting memory slot, delete the item from the memory slot;

responsive to the item failing to occupy one of the first predetermined number of memory slots immediately following the starting memory slot, determine whether the barrier bit has been set in association with the last of the first predetermined number of memory slots;

responsive to the barrier bit being set, probe at least the portion of the memory container for the item and, responsive to the item being found in the portion of the memory container, delete the item from the memory slot; and responsive to the barrier bit failing to be set, return a notification that the item does not exist in the memory container to the application.

17. The computer program product of claim 16, wherein the portion of the memory container is a second predetermined number of memory slots immediately following the starting memory slot and wherein the computer readable program further causes the computing device to:

responsive to the item occupying one of the second predetermined number of memory slots immediately following the starting memory slot, delete the item from the memory slot; and responsive to the item failing to occupy one of the second predetermined number of memory slots immediately following the starting memory slot, return a notification that the item does not exist in the memory container to the application.

18. An apparatus comprising:

a processor; and a memory coupled to the processor, wherein the memory comprises instructions which, when executed by the processor, cause the processor to:

responsive to receiving a request from an application to find an item in the memory container, calculate a starting memory slot for the item;

responsive to the item failing to occupy the starting memory slot, probe a first predetermined number of memory slots immediately following the starting memory slot for the item;

responsive to the item occupying one of the first predetermined number of memory slots immediately following the starting memory slot, return the item to the application;

responsive to the item failing to occupy one of the first predetermined number of memory slots immediately following the starting memory slot, determine whether a barrier bit has been set in association with the last of the first predetermined number of memory slots;

responsive to the barrier bit being set, probing at least a portion of the memory container for the item and, responsive to the item being found in the portion of the memory container, return the item to the application;

responsive to the barrier bit failing to be set, return a notification that the item does not exist in the memory container to the application;

responsive to receiving a request to insert the item in one of the plurality of memory slots in the memory container, calculate the starting memory slot for the item;

responsive to the starting memory slot being empty, store the item in the starting memory slot;

responsive to the starting memory slot being occupied, probe the first predetermined number of memory slots immediately following the starting memory slot for the item;

responsive to one of the first predetermined number of memory slots immediately following the starting memory slot being empty, store the item in the empty memory slot;

responsive to all of the first predetermined number of memory slots immediately following the starting memory slot being occupied, probe at least the portion of the memory container for an empty memory slot;

responsive to the empty memory slot being identified, store the item in the empty memory slot and setting the barrier bit has been set in association with the last of the first predetermined number of memory slots;

responsive to the empty memory slot failing to be identified, return a notification that the item cannot be stored in the memory container to the application.

* * * * *